US 8,125,952 B2
Feb. 28, 2012

(12) United States Patent
Sampath et al.

(54) SYNCHRONOUS MULTI-CHANNEL TRANSMISSIONS IN WIRELESS LOCAL AREA NETWORKS

(75) Inventors: Hemanth Sampath, San Diego, CA (US); Sameer Vermani, San Diego, CA (US); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 12/490,591

(22) Filed: Jun. 24, 2009

(65) Prior Publication Data
US 2010/0284312 A1 Nov. 11, 2010

Related U.S. Application Data

(60) Provisional application No. 61/176,849, filed on May 8, 2009.

(51) Int. Cl.
*H04W 4/00* (2009.01)
*H04J 4/00* (2006.01)
(52) U.S. Cl. .......... 370/330; 370/436; 370/478
(58) Field of Classification Search .......... 370/281, 370/295, 330, 343, 344, 436, 478
See application file for complete search history.

(56) References Cited

U.S. PATENT DOCUMENTS

| 7,336,626 B1* | 2/2008 | Barratt et al. ........... 370/281 |
| 2005/0063349 A1 | 3/2005 | LoGalbo et al. |
| 2006/0007907 A1 | 1/2006 | Shao et al. |
| 2008/0031182 A1* | 2/2008 | Maheshwari et al. ...... 370/320 |
| 2009/0103501 A1* | 4/2009 | Farrag et al. ........... 370/337 |
| 2010/0085954 A1* | 4/2010 | Keshavarzian et al. ..... 370/343 |
| 2010/0248631 A1* | 9/2010 | Chaudhri et al. .......... 455/62 |

FOREIGN PATENT DOCUMENTS

| EP | 1198093 | 4/2002 |
| GB | 2330729 | 4/1999 |
| WO | WO2005109761 A1 | 11/2005 |
| WO | WO2007112762 | 10/2007 |

OTHER PUBLICATIONS

Partial International Search Report—PCT/US2010/033665—International Search Authority, European Patent Office,Jun. 10, 2010.
International Search Report and Written Opinion—PCT/US2010/033665, International Search Authority—European Patent Office—Feb. 14, 2011 (092177).
International Preliminary Report on Patentability—PCT/US2010/033665, The International Bureau of WIPO—Geneva, Switzerland, Jul. 20, 2011 (092177WO).

* cited by examiner

*Primary Examiner* — Ronald Abelson
(74) *Attorney, Agent, or Firm* — Dang M. Vo

(57) ABSTRACT

Certain aspects of the present disclosure relate to a method for synchronous multi-channel transmissions in wireless local area networks. An access point can change allocation of its transmit and receive chains across multiple frequency bands ensuring that both uplink and downlink transmissions are properly performed for each station in a wireless system.

41 Claims, 7 Drawing Sheets

SYNCHRONIOUS MULTI-CHANNEL TRANSMISSIONS IN WIRELESS LOCAL AREA NETWORKS

CLAIM OF PRIORITY UNDER 35 U.S.C. §119

The present Application for Patent claims priority to Provisional Application No. 61/176,849 filed May 8, 2009, and assigned to the assignee hereof and hereby expressly incorporated by reference herein.

BACKGROUND

1. Field

Certain aspects of the present disclosure generally relate to wireless communications and, more particularly, to synchronous transmission and reception over multiple frequency bands.

2. Background

In order to address the issue of increasing bandwidth requirements that are demanded for wireless communications systems, different schemes are being developed to allow multiple user terminals (i.e., stations) to communicate with a single access point by sharing the channel resources while achieving high data throughputs. Multiple input multiple output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system with multi-band channel structure is considered, where an access point simultaneously communicates with multiple stations using different frequency bands. Each station can switch from one frequency band dedicated for data reception to another frequency band dedicated for data transmission. However, switching from one frequency band for transmission to another frequency band for reception (and vice-versa) at the station side can be complex and time consuming process.

Therefore, there is a need in the art for a method to communicate in multi-band wireless systems with lower complexity and smaller processing latency.

SUMMARY

Certain aspects provide a method for wireless communications. The method generally includes allocating a plurality of transmit chains to a first set of frequency bands of a plurality of frequency bands and allocating a plurality of receive chains to a second set of frequency bands of the plurality of frequency bands.

Certain aspects provide an apparatus for wireless communications. The apparatus generally includes a transmit chain allocator configured to allocate a plurality of transmit chains to a first set of frequency bands of a plurality of frequency bands and a receive chain allocator configured to allocate a plurality of transmit chains to a first set of frequency bands of a plurality of frequency bands.

Certain aspects provide an apparatus for wireless communications. The apparatus generally includes means for allocating a plurality of transmit chains to a first set of frequency bands of a plurality of frequency bands and means for allocating a plurality of receive chains to a second set of frequency bands of the plurality of frequency bands.

Certain aspects provide a computer-program product for wireless communications, comprising a computer-readable medium comprising instructions. The instructions are generally executable to allocate a plurality of transmit chains to a first set of frequency bands of a plurality of frequency bands and allocate a plurality of receive chains to a second set of frequency bands of the plurality of frequency bands.

Certain aspects provide an access point. The access point generally includes a plurality of antennas, a transmit chain allocator configured to allocate a plurality of transmit chains, coupled with the plurality of antennas, to a first set of frequency bands of a plurality of frequency bands, and a receive chain allocator configured to allocate a plurality of receive chains, coupled with the plurality of antennas, to a second set of frequency bands of the plurality of frequency bands.

Certain aspects provide a method for wireless communications. The method generally includes providing contention-free access for a plurality of wireless nodes across a plurality of frequency bands during a first portion of an inter-beacon interval and providing contention-based access for a plurality of wireless nodes across the plurality of frequency bands during a second portion of the inter-beacon interval.

Certain aspects provide an apparatus for wireless communications. The apparatus generally includes a contention-free access provider configured to provide contention-free access for a plurality of wireless nodes across a plurality of frequency bands during a first portion of an inter-beacon interval and a contention-based access provider configured to provide contention-based access for a plurality of wireless nodes across the plurality of frequency bands during a second portion of the inter-beacon interval.

Certain aspects provide an apparatus for wireless communications. The apparatus generally includes means for providing contention-free access for a plurality of wireless nodes across a plurality of frequency bands during a first portion of an inter-beacon interval and means for providing contention-based access for a plurality of wireless nodes across the plurality of frequency bands during a second portion of the inter-beacon interval.

Certain aspects provide a computer-program product for wireless communications, comprising a computer-readable medium comprising instructions. The instructions are generally executable to provide contention-free access for a plurality of wireless nodes across a plurality of frequency bands during a first portion of an inter-beacon interval and provide contention-based access for a plurality of wireless nodes across the plurality of frequency bands during a second portion of the inter-beacon interval.

Certain aspects provide an access point. The access point generally includes a plurality of antennas, a contention-free access provider configured to provide contention-free access for a plurality of wireless nodes, for communication with the access point via the plurality of antennas, across a plurality of frequency bands during a first portion of an inter-beacon interval, and a contention-based access provider configured to provide contention-based access for a plurality of wireless nodes, for communication with the access point via the plurality of antennas, across the plurality of frequency bands during a second portion of the inter-beacon interval.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
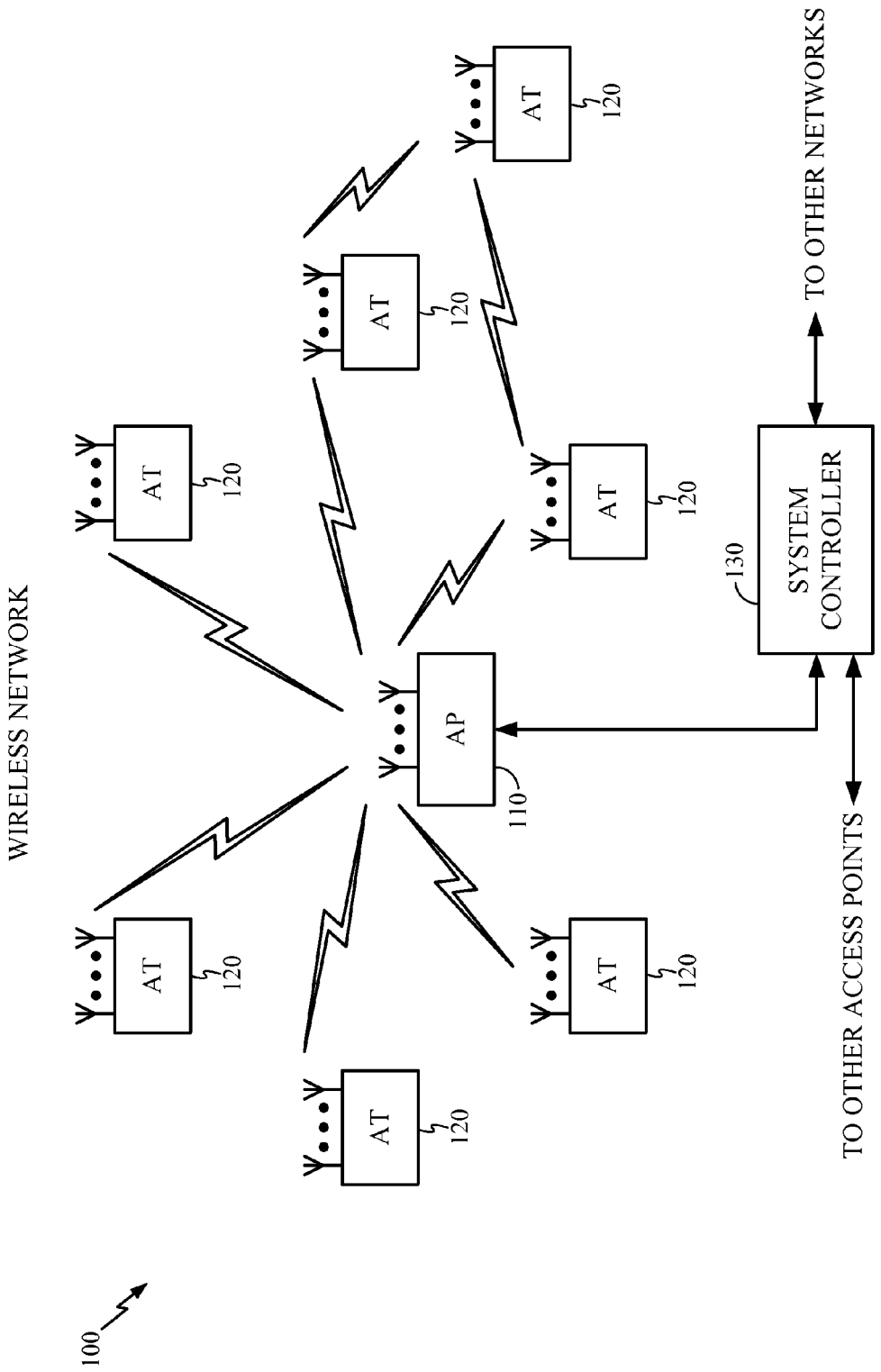
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows the term "receiving node" may be used to refer to a node that is receiving and the term "transmitting node" may be used to refer to a node that is transmitting. Such a reference does not imply that the node is incapable of performing both transmit and receive operations.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
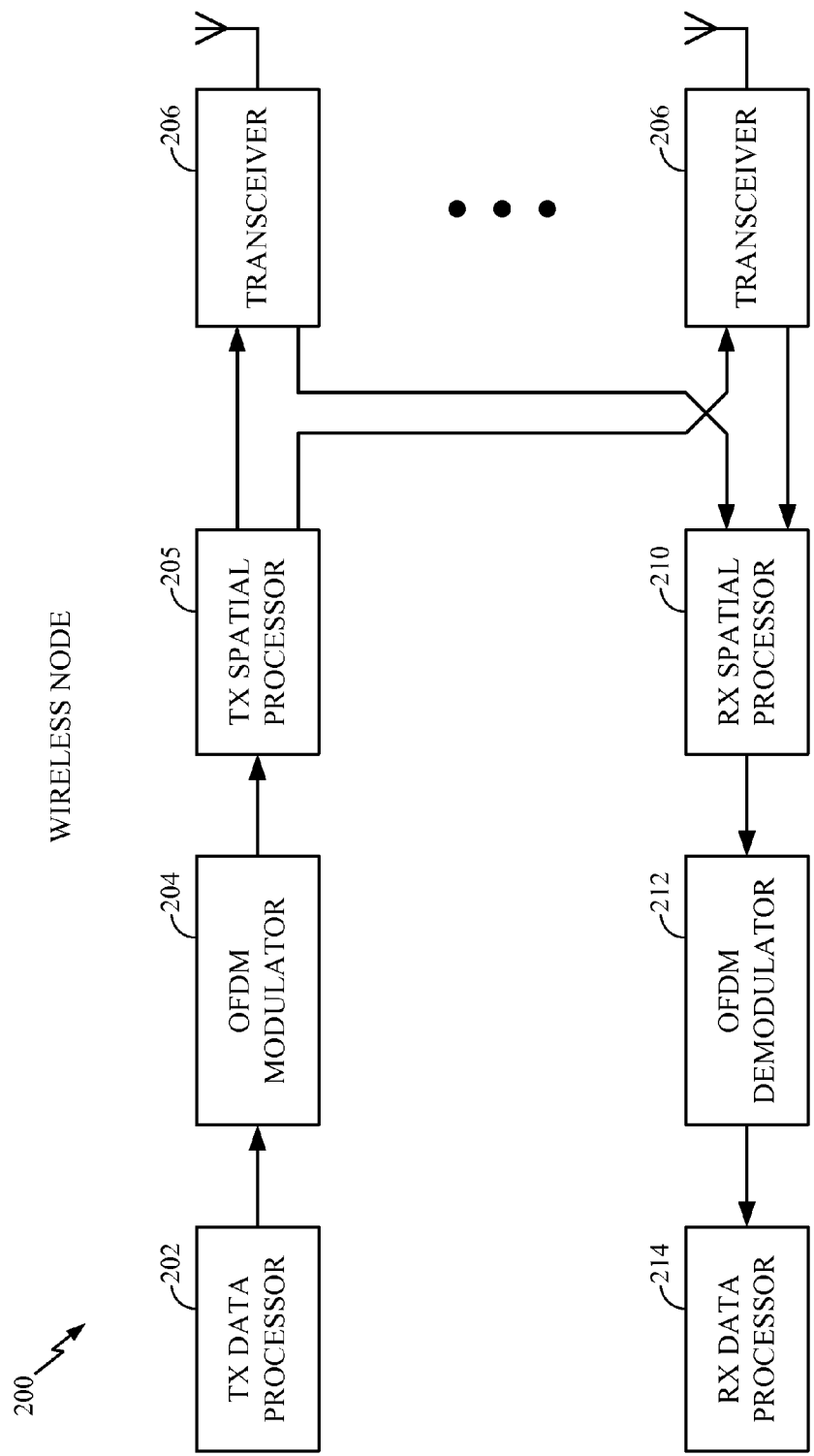
FIG. 2 illustrates a block diagram of an example of signal processing functions of a physical layer (PHY) of a wireless node in the wireless communications network of FIG. 1 in accordance with certain aspects of the present disclosure.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 206 performs spatial processing on the OFDM stream. This may be accomplished by spatially precoding each OFDM and then providing each spatially precoded stream to a different antenna 208 via a transceiver 206. Each transmitter 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

Figure 3:
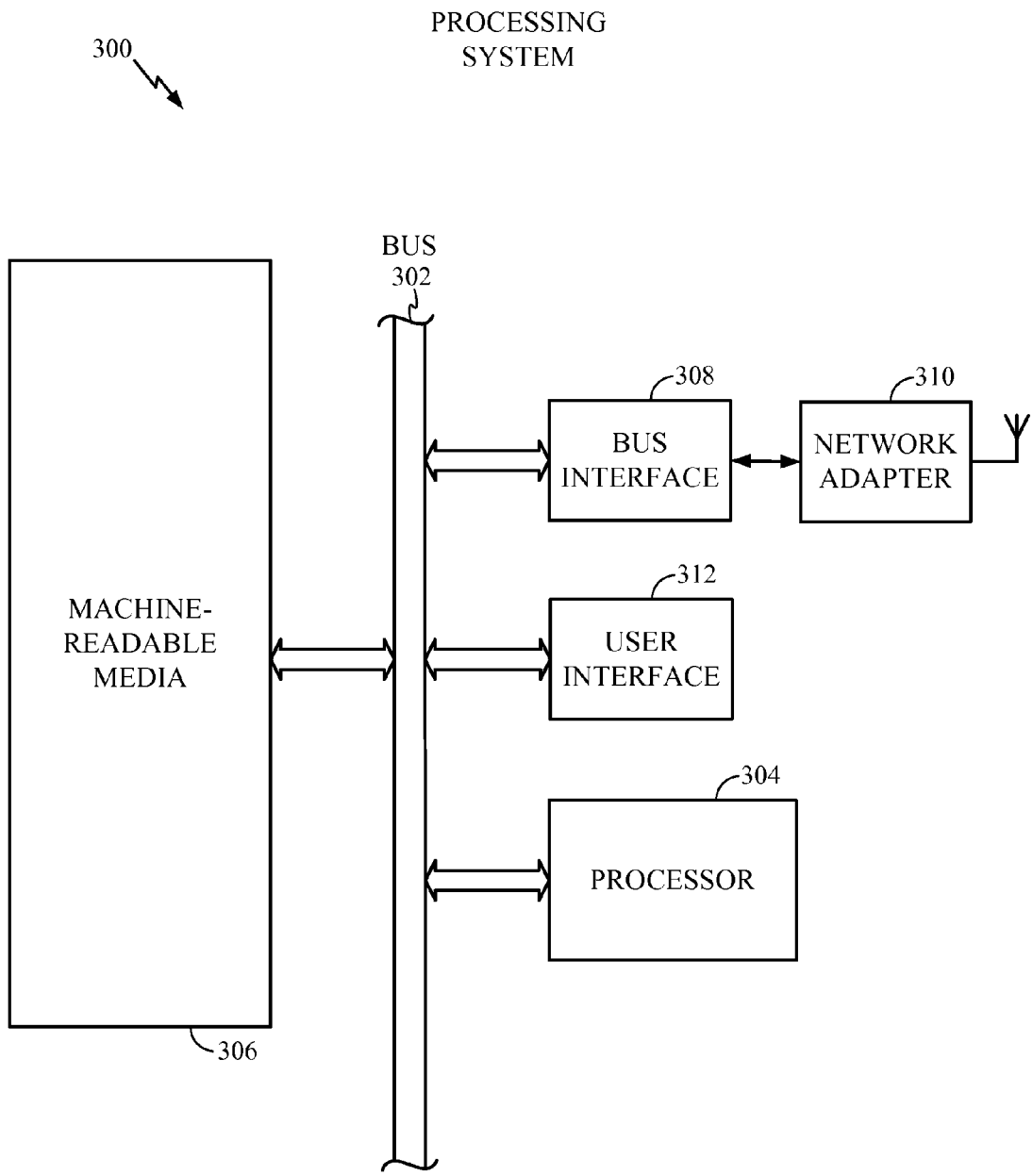
FIG. 3 illustrates a block diagram of an exemplary hardware configuration for a processing system in a wireless node in the wireless communications network of FIG. 1 in accordance with certain aspects of the present disclosure.

FIG. 3 is a conceptual diagram illustrating an example of a hardware configuration for a processing system in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, machine-readable media 306, and a bus interface 308. The bus interface 308 may be used to connect a network adapter 310, among other things, to the processing system 300 via the bus 302. The network adapter 310 may be used to implement the signal processing functions of the PHY layer. In the case of an access terminal 110 (see FIG. 1), a user interface 312 (e.g., keypad, display, mouse, joystick, etc.) may also be connected to the bus. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the machine-readable media 306. The processor 304 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 3, the machine-readable media 306 is shown as part of the processing system 300 separate from the processor 304. However, as those skilled in the art will readily appreciate, the machine-readable media 306, or any portion thereof, may be external to the processing system 300. By way of example, the machine-readable media 306 may include a transmission line, a carrier wave modulated by data, and/or a computer product separate from the wireless node, all which may be accessed by the processor 304 through the bus interface 308. Alternatively, or in addition to, the machine readable media 306, or any portion thereof, may be integrated into the processor 304, such as the case may be with cache and/or general register files.

The processing system 300 may be configured as a general-purpose processing system with one or more microprocessors providing the processor functionality and external memory providing at least a portion of the machine-readable media 306, all linked together with other supporting circuitry through an external bus architecture. Alternatively, the processing system 300 may be implemented with an ASIC (Application Specific Integrated Circuit) with the processor 304, the bus interface 308, the user interface 312 in the case of an access terminal), supporting circuitry (not shown), and at least a portion of the machine-readable media 306 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 300 depending on the particular application and the overall design constraints imposed on the overall system.

Communication between the access point (AP) 110 and multiple access terminals (i.e., stations) 120 may be performed over multiple frequency bands. Each station (STA) may switch from one frequency band dedicated for transmission to another frequency band dedicated for reception. However, complexity of the switching procedure may be prohibitively high and time consuming. By applying an approach proposed in this disclosure, switching of frequency bands at each STA may be avoided and placed at the AP side. The AP may change the distribution of its transmit and receive chains across multiple frequency bands to ensure that both uplink and downlink transmissions are properly performed for each STA in the wireless system.

Synchronious Multi-Channel Transmissions

Figure 4:
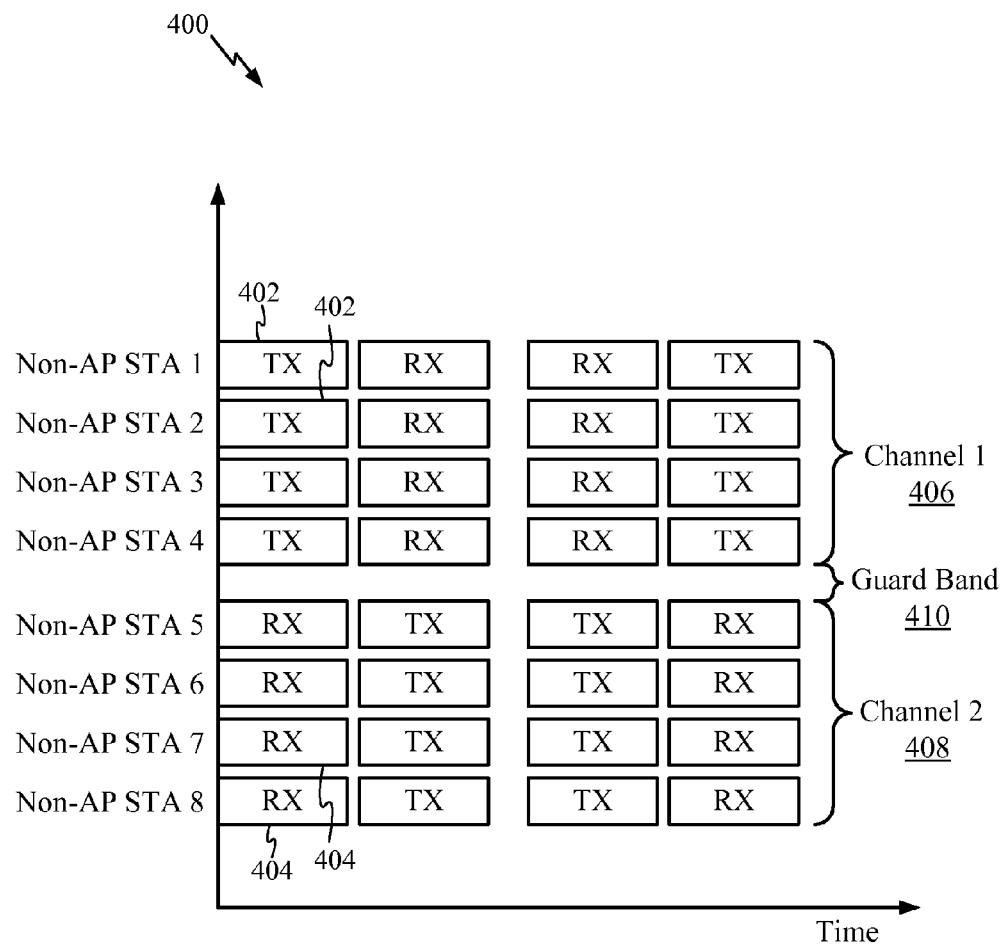
FIG. 4 illustrates an example of multi-channel structure for communicating between an access point and multiple stations in accordance with certain aspects of the present disclosure.

FIG. 4 illustrates an example of how multiple transmit chains (indicated by blocks 402) and/or receive chains (indicated by blocks 404) may be allocated across multiple frequency bands in a multi-channel architecture. As illustrated, at any given time, transmit chains 402 may be distributed across multiple frequency bands, and receive chains 404 may be distributed across another set of multiple frequency bands distinct from the frequency bands allocated to the transmit chains.

As used herein, the terms transmit and receive chains generally refer to processing elements used to process data for transmission to other wireless nodes and to process data received from other wireless nodes, respectively.

In the illustrated example, for a first time period, the transmit chains may be allocated to a first set of frequency bands (corresponding to a first channel 406), while the receive chains may be allocated to a second set of frequency bands (corresponding to a second channel 408) distinct from the first set of frequency bands. As illustrated in FIG. 4, the first set of frequency bands may be separated from the second set of frequency bands by a guard band 410. At a subsequent time period, the transmit and receive chains may be re-allocated to other frequency bands. For example, as illustrated in FIG. 4, the receive chains may be allocated to the first set of frequency bands (corresponding to the first channel 406) and the transmit chains may be allocated to the second set of frequency bands (corresponding to the second channel 408).

According to certain aspects, transmission on the first set of frequency bands may be synchronous (e.g., starting at approximately the same time) with reception on the second set of frequency bands. As used herein, the term synchronous may generally refer to transmission start times on the first set of frequency bands that are substantially equal to reception start times on the second set of frequency bands, while the transmission end times on the first set of frequency bands may be substantially equal to the reception end time on the second set of frequency bands.

Figure 5:
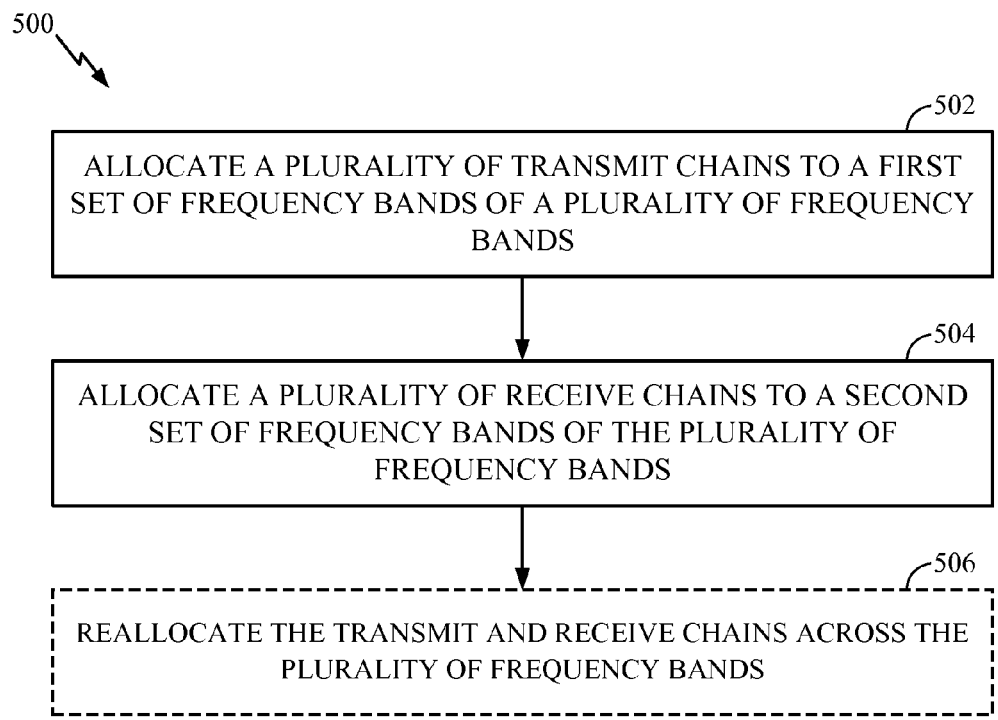
FIG. 5 illustrates example operations to allocate at the access point transmit and receive chains across multiple frequency bands in accordance with certain aspects of the present disclosure.

FIG. 5 illustrates example operations 500 for allocation of transmit and receive chains across frequency bands in accordance with certain aspects of the present disclosure. At 502, a plurality of transmit chains may be allocated to a first set of frequency bands of a plurality of frequency bands. At 504, a plurality of receive chains may be allocated to a second set of frequency bands of the plurality of frequency bands. The second set of frequency bands may be distinct from the first set of frequency bands and, in some cases, non-overlapping as illustrated in FIG. 4. At 506, the transmit and receive chains may be reallocated across the plurality of frequency bands.

Figure 6:
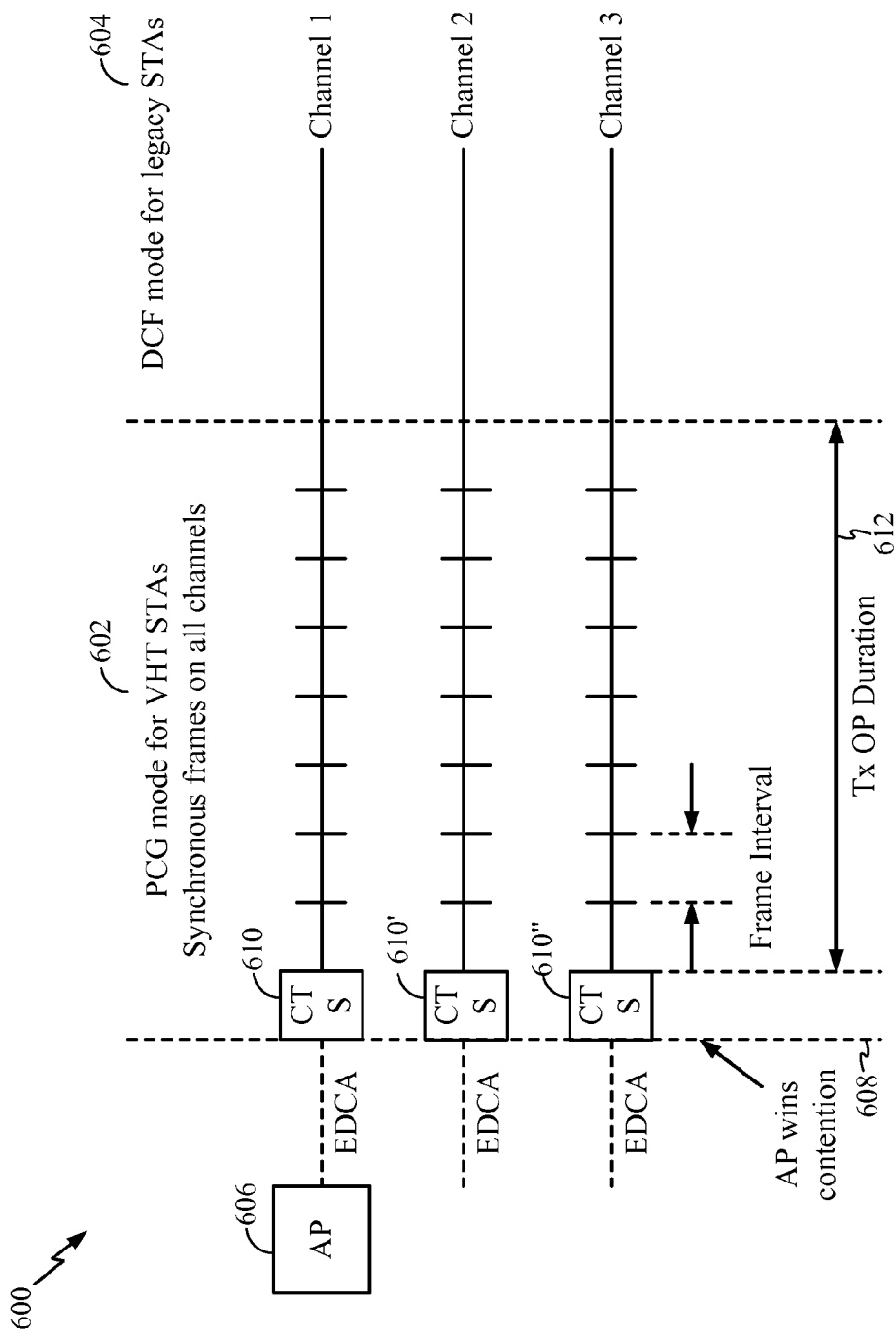
FIG. 6 illustrates an example division of an inter-beacon interval into a contention free period and a contention period in accordance with certain aspects of the present disclosure.

FIG. 6 illustrates an example of dividing an inter-beacon interval into a contention free access period and a contention access period. Certain aspects of the present disclosure support communication across multiple frequency bands during an inter-beacon interval 600, where an AP 606 may split the inter-beacon interval 600 into two portions: a time period for contention free access 602 and a time period for contention access 604, as illustrated in FIG. 6.

The contention free access period 602 is the period when a contention free channel access is provided by a Point Coordinator (PC), such as the AP 606 in the illustrated example. During the contention free access period 602, the AP 606 may operate in a Point Coordinated Function (PCF) mode and may coordinate communication with, for example, Very High Throughput (VHT) stations (STAs). On the other hand, the contention access period 604 is the period when all wireless nodes contend for the channel using a Distributed Coordinated Function (DCF). During the contention access period 604, the AP 606 may operate in a DCF mode and may coordinate communication with, for example, legacy STAs.

The AP 606 may win contention to access channel resources at a time 608 by employing, for example, the Enhanced Distributed Channel Access (EDCA) protocol. After that, the AP may transmit a Clear-to-Send (CTS) message 610 over a multiband channel (i.e, the CTS message 610 may be transmitted over the Channel 1, the CTS message 610' may be transmitted over the Channel 2, and the CTS message 610" may be transmitted over the Channel 3, as illustrated in FIG. 6). The end of the CTS message 610 may represent beginning of a transmit opportunity duration period 612 within the contention free access period 602.

The time period for contention free access 602 may be synchronized across multiple frequency bands, i.e. a start time of the contention free access on multiple frequency bands may be the same, and an end time of the contention free access on the multiple frequency bands may be the same. The contention free access time period 602 spanned across the multiple frequency bands may be divided into frame intervals of equal length, as illustrated in FIG. 6. In any frame interval, a frequency band may be dedicated to either transmit chains or receive chains. Transmit chains may be also distributed across a first set of frequency bands, and receive chains may be distributed across a second set of frequency bands distinct from the first set of frequency bands. On the other side of communication link, a STA associated with the AP may be capable of transmitting and receiving on a single frequency band.

The AP 606 (i.e., AP1) may communicate with another AP (i.e., AP2) in order to synchronize their contention free access times. The AP 1 and the AP2 may split the contention free access time into two intervals, where the AP 1 may use the first interval and the AP2 may use the second interval. The AP1 and the AP2 may select non-overlapping sets of frequency bands in order to enable contention free access in a basic service set (BSS) of the AP1 and in another BSS of the AP2.

In one aspect of the present disclosure, the AP may initiate a time interval for synchronous duplex communication by obtaining a plurality of channels using the Enhanced Distributed Channel Access (EDCA) protocol during the contention access period. In another aspect of the present disclosure, the time interval for synchronous duplex communication may be obtained using the Priority Inter-frame Space (PIFS) access protocol.

The initiated time interval may be divided into frame intervals of equal length. A frequency band in each frame interval may be dedicated to either transmit chains or receive chains. The transmit chains may be also distributed across multiple frequency bands, and receive chains may be distributed across another set of multiple frequency bands distinct from the transmit chain frequency bands.

Figure 7:
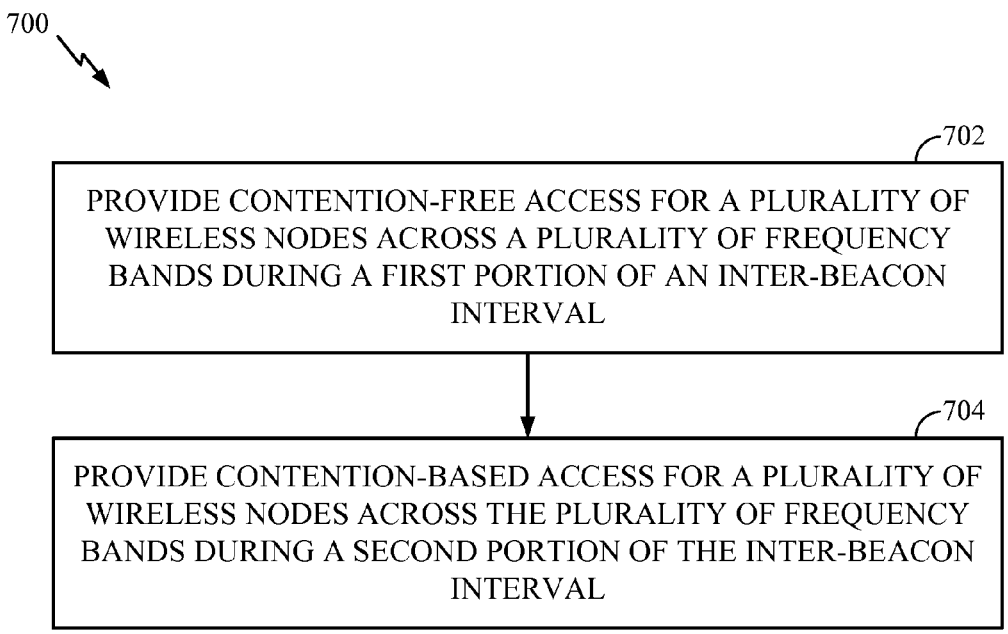
FIG. 7 illustrates example operations for providing contention-free access and contention-based access for multiple stations across multiple frequency bands in accordance with certain aspects of the present disclosure.

FIG. 7 illustrates example operations 700 for providing contention-free access and contention-based access for multiple wireless nodes across multiple frequency bands in accordance with certain aspects of the present disclosure. At 702, contention-free access may be provided for a plurality of wireless nodes across a plurality of frequency bands during a first portion of an inter-beacon interval (i.e., a contention-free access period). At 704, contention-based access may be provided for a plurality of wireless nodes across the plurality of frequency bands during a second portion of the inter-beacon interval (i.e., a contention-based access period).

Figure 5A:
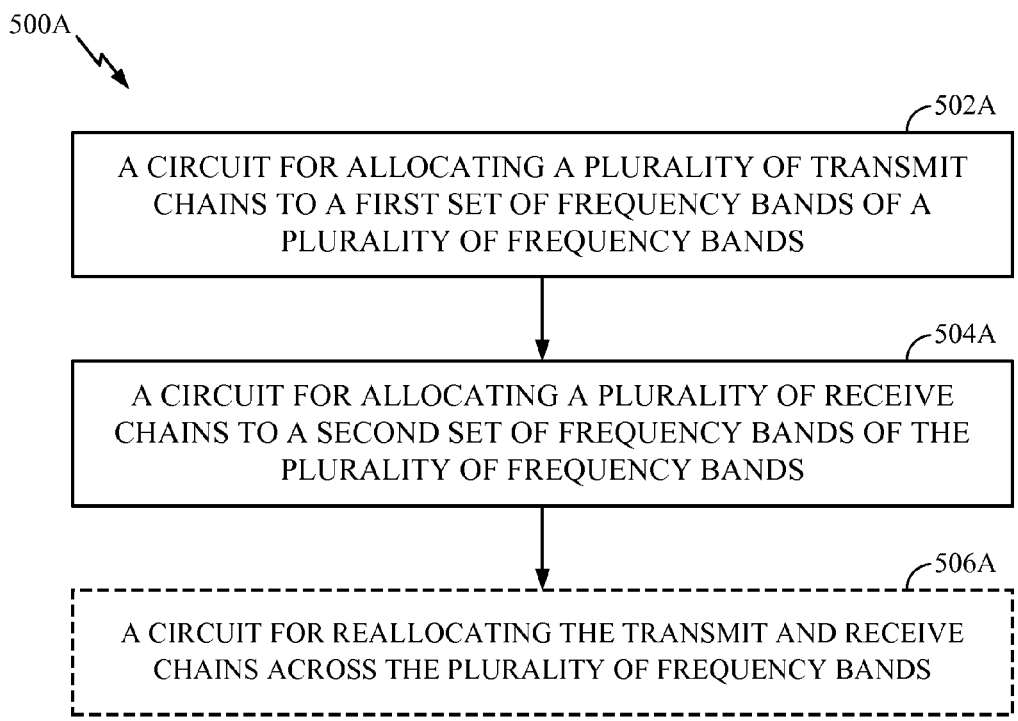
FIG. 5A illustrates example components capable of performing the operations illustrated in FIG. 5.
Figure 7A:
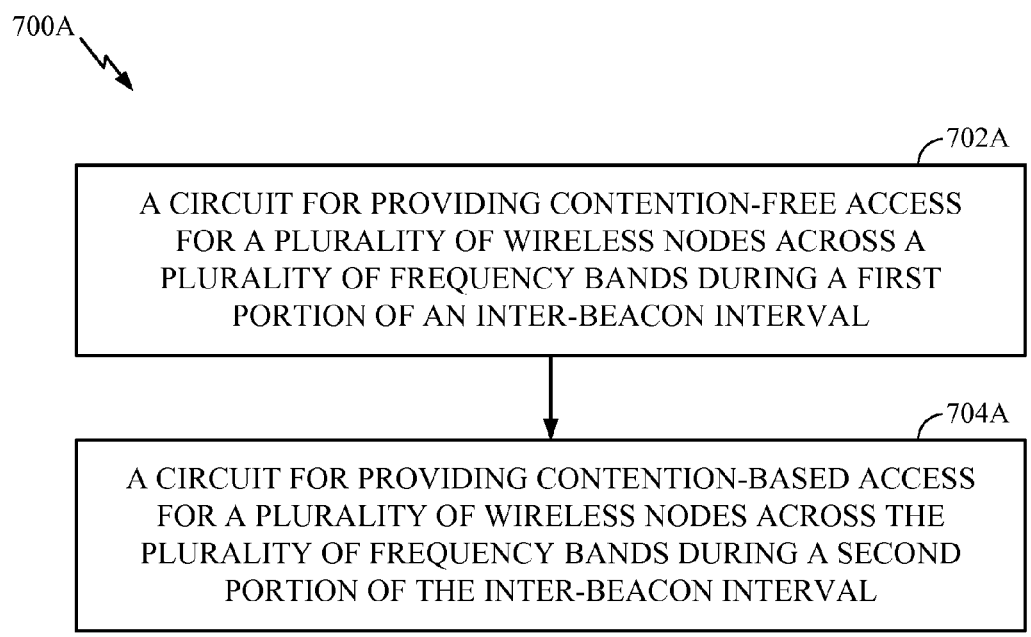
FIG. 7A illustrates example components capable of performing the operations illustrated in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 502-506 and 702-704 illustrated in FIGS. 5 and 7 correspond to circuit blocks 502A-506A and 702A-704A illustrated in FIGS. 5A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

The invention claimed is:

1. A method for wireless communications, comprising:
   contending, by an apparatus, for access to a plurality of frequency bands for a contended for inter-beacon interval;
   providing, by the apparatus, contention-free access for a plurality of wireless nodes across the plurality of frequency bands, simultaneously, during a first portion of the contended for inter-beacon interval; and
   providing, by the apparatus, contention-based access for a plurality of wireless nodes across the plurality of frequency bands, simultaneously, during a second portion of the contended for inter-beacon interval.

2. The method of claim 1, wherein:
   the first portion for contention-free access starts at the same time for each frequency band and ends at the same time for each frequency band.

3. The method of claim 1, wherein the first portion for contention-free access is divided into a plurality of frame intervals of equal length on each frequency band.

4. The method of claim 3, wherein each frame interval from the plurality of frame intervals is used either for transmitting data or for receiving data.

5. The method of claim 3, further comprising:
   transmitting data in frame intervals of the plurality of frame intervals over a first set of frequency bands of the plurality of frequency bands; and
   receiving data in frame intervals of the plurality of frame intervals over a second set of frequency bands of the plurality of frequency bands distinct from the first set of frequency bands.

6. The method of claim 1, further comprising:
   communicating, by a first apparatus, with a second apparatus to synchronize the first portion for contention-free access with another time interval for contention-free access of the second apparatus.

7. The method of claim 6, wherein the first portion for contention free access is divided into a first time interval used by the first apparatus and a second time interval used by the second apparatus.

8. The method of claim 6, wherein the first and second apparatuses choose non-overlapping sets of frequency bands to enable contention free access in a basic service set (BSS) associated with the first apparatus and in another BSS associated with the second apparatus.

9. The method of claim 1, further comprising
obtaining multiple frequency bands; and
performing synchronous duplex communication over the multiple frequency bands.

10. The method of claim 9, wherein obtaining the multiple frequency bands comprises gaining access to the multiple frequency bands according to the Enhanced Distributed Channel Access (EDCA) protocol.

11. The method of claim 9, wherein obtaining the multiple frequency bands comprises gaining access to the multiple frequency bands according to the Priority Inter-frame Space (PIFS) access protocol.

12. The method of claim 1, further comprising:
allocating a plurality of transmit chains to a first set of the frequency bands; and
allocating a plurality of receive chains to a second set of the frequency bands.

13. An apparatus for wireless communications, comprising:
a processor configured to contend for access to a plurality of frequency bands for a contended for inter-beacon interval;
a contention-free access provider configured to provide contention-free access for a plurality of wireless nodes across the plurality of frequency bands, simultaneously, during a first portion of the contended for inter-beacon interval; and
a contention-based access provider configured to provide contention-based access for the plurality of wireless nodes across the plurality of frequency bands, simultaneously during a second portion of the contended for inter-beacon interval.

14. The apparatus of claim 13, wherein:
the first portion for contention-free access starts at the same time for each frequency band and ends at the same time for each frequency band.

15. The apparatus of claim 13, wherein the first portion for contention-free access is divided into a plurality of frame intervals of equal length on each frequency band.

16. The apparatus of claim 15, wherein each frame interval from the plurality of frame intervals is used either for transmitting data or for receiving data.

17. The apparatus of claim 15, further comprising:
a transmitter configured to transmit data in frame intervals of the plurality of frame intervals over a first set of frequency bands of the plurality of frequency bands; and
a receiver configured to receive data in frame intervals of the plurality of frame intervals over a second set of frequency bands of the plurality of frequency bands distinct from the first set of frequency bands.

18. The apparatus of claim 13, further comprising:
a synchronization logic configured to communicate with another apparatus to synchronize the first portion for contention-free access with another time interval for contention-free access of the other apparatus.

19. The apparatus of claim 18, wherein the first portion for contention free access is divided into a first time interval used by the apparatus and a second time interval used by the other apparatus.

20. The apparatus of claim 18, wherein the apparatus and the other apparatus choose non-overlapping sets of frequency bands to enable contention free access in a basic service set (BSS) associated with the apparatus and in another BSS associated with the other apparatus.

21. The apparatus of claim 13, further comprising
a duplex communication logic configured to obtain multiple frequency bands and perform synchronous duplex communication over the multiple frequency bands.

22. The apparatus of claim 21, wherein the duplex communication logic comprises a logic configured to gain access to the multiple frequency bands according to the Enhanced Distributed Channel Access (EDCA) protocol.

23. The apparatus of claim 21, wherein the duplex communication logic comprises a logic configured to gain access to the multiple frequency bands according to the Priority Inter-frame Space (PIFS) access protocol.

24. The apparatus of claim 13, further comprising:
an allocation logic configured to allocate a plurality of transmit chains to a first set of the frequency bands and to allocate a plurality of receive chains to a second set of the frequency bands.

25. An apparatus for wireless communications, comprising:
means for contending for access to a plurality of frequency bands for a contended for inter-beacon interval;
means for providing contention-free access for a plurality of wireless nodes across the plurality of frequency bands, simultaneously, during a first portion of the contended for inter-beacon interval; and
means for providing contention-based access for a plurality of wireless nodes across the plurality of frequency bands, simultaneously, during a second portion of the contended for inter-beacon interval.

26. The apparatus of claim 25, wherein:
the first portion for contention-free access starts at the same time for each frequency band and ends at the same time for each frequency band.

27. The apparatus of claim 25, wherein the first portion for contention-free access is divided into a plurality of frame intervals of equal length on each frequency band.

28. The apparatus of claim 27, wherein each frame interval from the plurality of frame intervals is used either for transmitting data or for receiving data.

29. The apparatus of claim 27, further comprising:
means for transmitting data in frame intervals of the plurality of frame intervals over a first set of frequency bands of the plurality of frequency bands; and
means for receiving data in frame intervals of the plurality of frame intervals over a second set of frequency bands of the plurality of frequency bands distinct from the first set of frequency bands.

30. The apparatus of claim 25, further comprising:
means for communicating with another apparatus to synchronize the first portion for contention-free access with another time interval for contention-free access of the other apparatus.

31. The apparatus of claim 30, wherein the first portion for contention free access is divided into a first time interval used by the apparatus and a second time interval used by the other apparatus.

32. The apparatus of claim 30, wherein the apparatus and the other apparatus choose non-overlapping sets of frequency bands to enable contention free access in a basic service set (BSS) associated with the apparatus and in another BSS associated with the other apparatus.

33. The apparatus of claim 25, further comprising
means for obtaining multiple frequency bands; and
means for performing synchronous duplex communication over the multiple frequency bands.

34. The apparatus of claim 33, wherein the means for obtaining the multiple frequency bands comprises means for gaining access to the multiple frequency bands according to the Enhanced Distributed Channel Access (EDCA) protocol.

35. The apparatus of claim 33, wherein the means for obtaining the multiple frequency bands comprises means for gaining access to the multiple frequency bands according to the Priority Inter-frame Space (PIFS) access protocol.

36. The apparatus of claim 25, further comprising:
means for allocating a plurality of transmit chains to a first set of the frequency bands; and
means for allocating a plurality of receive chains to a second set of the frequency bands.

37. A computer-program product for wireless communications, comprising a computer-readable medium comprising instructions executable by an apparatus to:
contend for access to a plurality of frequency bands for a contended for inter-beacon interval;
provide contention-free access for a plurality of wireless nodes across the plurality of frequency bands, simultaneously, during a first portion of the contended for inter-beacon interval; and
provide contention-based access for a plurality of wireless nodes across the plurality of frequency bands, simultaneously, during a second portion of the contended for inter-beacon interval.

38. An access point, comprising:
a plurality of antennas;
a processor configured to contend for access to a plurality of frequency bands for a contended for inter-beacon interval;
a contention-free access provider configured to provide contention-free access for a plurality of wireless nodes, for communication with the access point via the plurality of antennas, across the plurality of frequency bands, simultaneously, during a first portion of the contended for inter-beacon interval; and
a contention-based access provider configured to provide contention-based access for a plurality of wireless nodes, for communication with the access point via the plurality of antennas, across the plurality of frequency bands, simultaneously, during a second portion of the contended for inter-beacon interval.

39. The method of 12, wherein the first set of frequency bands is separated from the second set of frequency bands by a guard band.

40. The apparatus of 24, wherein the first set of frequency bands is separated from the second set of frequency bands by a guard band.

41. The apparatus of 36, wherein the first set of frequency bands is separated from the second set of frequency bands by a guard band.

* * * * *